UNITED STATES PATENT OFFICE.

SANFORD HOYT DEUEL, OF CHICAGO, ILLINOIS.

COMPOSITION FOR COATING SLIDES.

1,055,720.  Specification of Letters Patent.  Patented Mar. 11, 1913.

No Drawing.  Application filed April 8, 1912. Serial No. 689,370.

*To all whom it may concern:*

Be it known that I, SANFORD HOYT DEUEL, a citizen of the United States, and a resident of the city of Chicago, county of Cook, and State of Illinois, have invented a new and Improved Composition for Coating Slides, of which the following is a specification.

My invention relates to a composition designed for use in coating transparent slides which are used in projecting lanterns or machines.

The object of my invention is the production of a composition of the character mentioned which may be readily and easily applied to the surface of a transparent slide and which will form a coating upon the slide in which may be readily scratched any advertising which it is desired to project upon the screen or other surface by the projecting machine.

A further object is the production of a composition as mentioned, adapted to form a coating upon a transparent slide as mentioned, which may be readily removed when desired without scratching, marring or otherwise injuring the surface to which it is applied.

My composition consists of the following ingredients, combined in the preparations stated, viz: filtered water, 8 ounces; calcium carbonate, 15 ounces; ultramarine blue, ¾ of an ounce, and gum arabic 1½ ounces.

These ingredients are to be thoroughly mingled by agitation.

The resulting composition is in the form of a blue-gray paste, which is applied to the surface of the slide, preferably with a brush. When the coat formed upon the slide is dry, the same may be scratched by a pointed tool in order to display any advertising which it is desired to project upon the screen or other surface by the projecting machine. The coating which is formed upon the slide is practically opaque, the rays of light from the projecting machine passing through the portions of the slide from which the coating has been removed by scratching as above mentioned.

The employment of calcium carbonate in the composition is highly important, since calcium carbonate is an inert heat resisting material; the latter qualification being essential because of the great heat to which the coating is subjected by reason of the proximity of the slide to the source of illumination, when the slide is in use, and also by reason of the heat caused by focusing the light rays upon the slide during the operation of the machine. In this connection it might be said that calcium sulfate or plaster of Paris or other similar substance could not be used, since the latter disintegrates under heat and hence would be affected, that is decomposed by the rays of light from the projecting machine.

The composition may be manufactured at an exceedingly low cost and is of high efficiency in use.

While I have set forth the exact proportions of the ingredients of the composition, it is understood that same may be changed if desired without departing from the spirit of the invention. And also, although I have set forth the preferred ingredients of the composition, the same may be altered somewhat without departing from the spirit of the invention. I therefore do not wish to be limited to the exact composition set forth, but desire to avail myself of such modifications as fairly fall within the scope of the appended claim.

I claim:

The herein described composition of matter consisting of water, 8 ounces; calcium carbonate, 15 ounces; ultramarine blue, ¾ of an ounce; and gum arabic, 1½ ounces, substantially as described and for the purpose specified.

In testimony whereof I have signed my name to this specification in the presence of two subscribing witnesses.

SANFORD HOYT DEUEL.

Witnesses:
ARTHUR A. OLSON,
JOSHUA R. H. POTTS.

Copies of this patent may be obtained for five cents each, by addressing the "Commissioner of Patents, Washington, D. C."